Patented Sept. 14, 1954

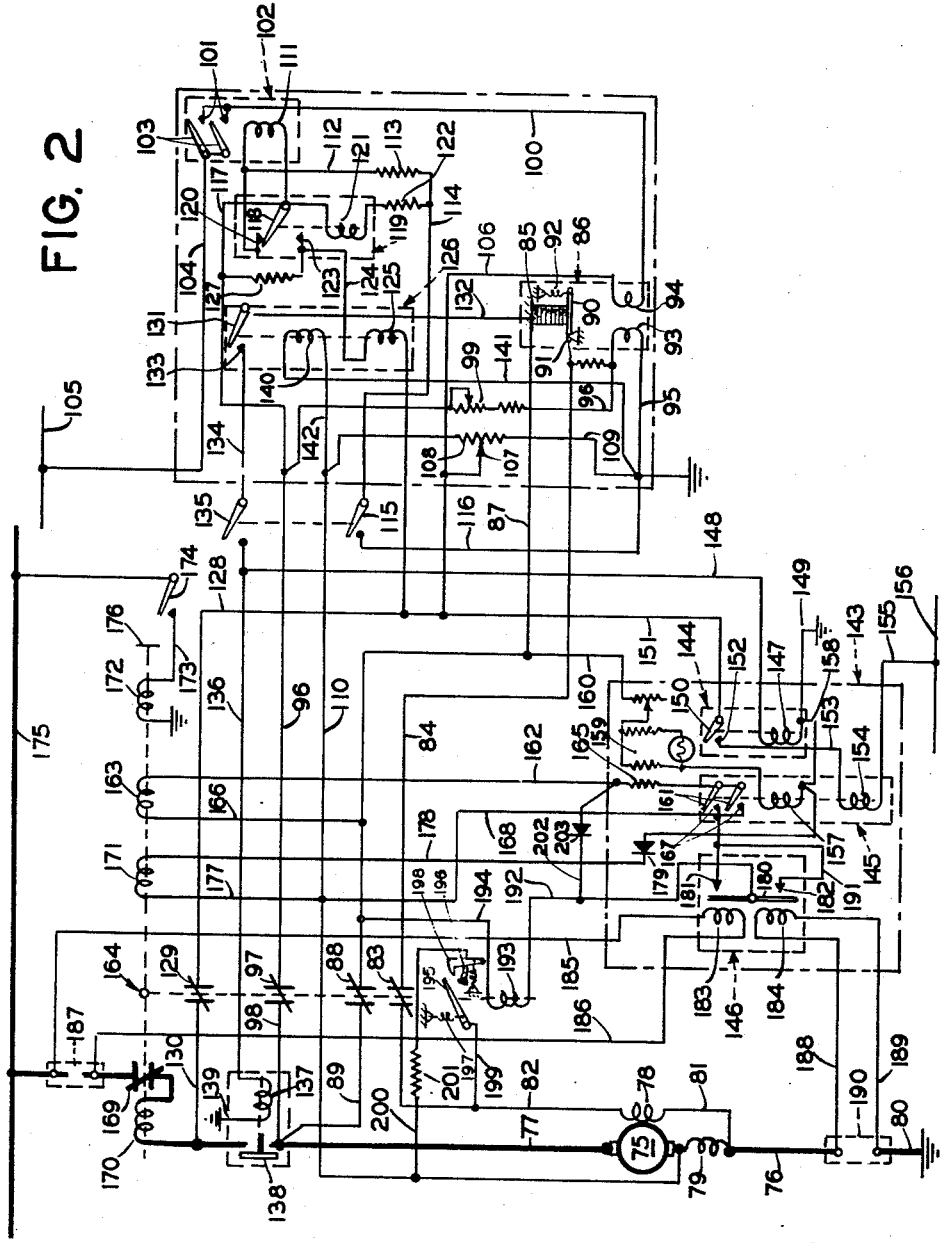

2,689,316

UNITED STATES PATENT OFFICE 2,689,316

GENERATOR PROTECTIVE DEVICE

Harold S. Gillespie, Hasbrouck Heights, N. J., assignor to Bendix Aviation Corporation, Teterboro, N. J., a corporation of Delaware Application December 19, 1951, Serial No. 262,406

1 Claim. (Cl. 317—13)

The present invention relates to protective systems for dynamoelectric machines and more particularly to protective systems for faults on generator feeders.

In airplanes, it is highly expedient to protect the electrical system against trouble of all kinds, not only to protect the electrical equipment but also to prevent any potential fire hazard from developing. Generators of the type used in airplanes normally are provided with overvoltage and overload protection. Due to the load on the generator, it is necessary that the overload protection be set high enough to carry normal loads. In order to protect for faults in the generator load line that may develop that would not be sufficient to operate the overload protective device, fault protection is incorporated in the protective device. Most generator control and protective systems for airplanes include some sort of field breaker which opens the generator field circuit at one or more points upon the occurrence of a ground fault. However, should a fault occur across the main output terminals or on the positive feeder, the generator will continue to feed the fault to maintain an arc or produce "high resistance heating" at the point of the fault.

In the present invention means are provided to connect the shunt field in opposition to the series field upon the occurrence of a fault. Thus, the voltage drop in the series field due to the short circuit current would be impressed on the shunt field in such a direction as to cause a reverse current to flow in the shunt field which reduces the net M. M. F. producing flux across the air gap of the generator and reduces or kills the short circuit current of the generator.

It is an object of the present invention to provide improved fault protection for a dynamoelectric machine.

Another object of the invention is to provide an improved protective system for generators.

Another object of the invention is to provide means for reducing short circuit currents which persist after the main field has been opened.

These and other objects and features of the invention will appear more fully hereinafter from a consideration of the following description taken in connection with the accompanying drawings wherein two embodiments of the invention are illustrated by way of example.

In the drawings:

Figure 2 is a schematic diagram of a generator and associated circuits embodying another form of the invention.

Figure 1:
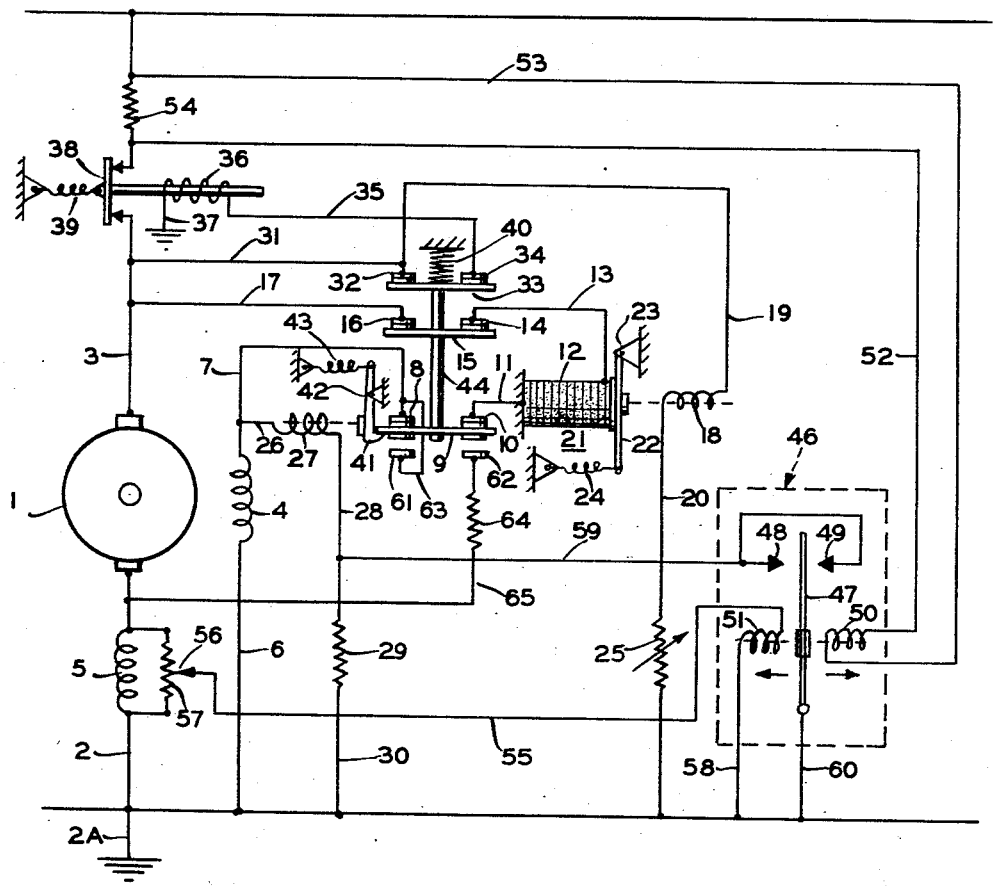
Figure 1 is a schematic diagram of a generator and associated circuits embodying one form of the invention.

Referring now to Figure 1 of the drawing, there is provided a generator 1 having output lines 2 and 3, field winding 4 and interpole and compensating winding 5. The winding 5 is connected in series with one output terminal of the generator 1 and the output line 2. A ground connection 2A connects the line 2 to ground. The field winding 4 is connected at one end to the output line 2 by a conductor 6. The other end of the winding 4 is connected by a conductor 7 to a contact 8 which is controlled by a switch member 9. The switch member 9 cooperates with a second switch contact 10. Leading from the switch contact 10 is a conductor 11 which in turn is connected to one end of a variable resistance carbon pile element 12. The other end of the carbon pile element 12 is connected by a conductor 13 to a switch contact 14 controlled by a switch member 15 which cooperates with a second switch contact 16. Leading from the switch contact 16 is a conductor 17 which is connected to the output line 3.

A winding 18 is connected by conductors 19 and 20 across the output of the generator 1 and provides electromagnet means which are so arranged in carbon pile regulator 21 as to control an armature 22 thereof and thereby the pressure applied to the carbon pile 12. The regulator 21 is shown diagrammatically in the drawing as including the armature 22 pivoted at 23 and exerting a compressive force upon the carbon pile 12 under the tension of a spring 24. The spring 24 is arranged so as to balance the pull on the armature 22 by the electromagnet 18 when energized by a line voltage having a predetermined value. A variable resistance 25 inserted in the conductor 20 permits adjustment of the electromagnet 18. The regulator 21 may be of a type such as shown in U. S. Patent No. 2,427,805, granted September 23, 1947 to William G. Neild.

Leading from the conductor 7 is a conductor 26 connected to one end of a potential coil 27. The other end of the coil 27 is connected by a conductor 28 to one end of a resistor 29. The other end of the resistor 29 is connected by a conductor 30 to the output line 2. With the switch members 9 and 15 in the closed position as shown, it will be seen that the carbon pile 12 will be connected in series with the field 4 of the generator 1 so as to regulate the voltage across the lines 2 and 3.

Leading from the output line 3 is a conductor 31 connected to a switch contact 32 controlled by a switch member 33 which cooperates with a second switch contact 34. The switch contact 34 is connected by a conductor 35 to an electromagnetic winding 36. The winding 36 is grounded at the opposite end by a conductor 37. The winding 36 controls a main line circuit breaker 38 which is biased in a circuit open position by a spring 39.

The switch members 9, 15 and 33 are biased under tension of a spring 40 in a direction for opening the aforenoted respective circuits controlled thereby but are held from opening by a latch member 41 pivoted at 42 under tension of a spring 43 so as to lock the switch members 9, 15 and 33 in the closed position as shown. The switch members 9, 15 and 33 are mechanically connected by a suitable rod 44. Thus, the switch members 9, 15 and 33 are normally held in a circuit closing position by the latch member 41. The latch member 41 is controlled by the winding 27 which is connected as previously described across the field winding 4 of the generator 1.

The portion of the control system as set forth above is of the type such as is shown in Reissue Patent No. 23,551 granted to William F. Fell and U. S. Patent No. 2,522,601 granted to Robert L. Brown.

The fault detecting portion of the control circuit may be of the type disclosed and claimed in application serial No. 135,681, filed December 29, 1949 by William R. Holmes, however, it is understood that other methods of fault detecting may be used.

In order to detect faults, a sensitive differential type relay 46 is provided and comprises a movable armature 47, contacts 48 and 49 and coils 50 and 51. The coil 50 is connected by conductors 52 and 53 across a resistance 54 located in the line 3 while one end of the coil 51 is connected by conductor 55 to a movable tap 56 on a potentiometer 57. The potentiometer 57 is connected across the interpole and compensating winding 5. The other end of the coil 51 is connected by conductor 58 to the output line 2. The contacts 48 and 49 are connected by a conductor 59 to the conductor 28 and the armature 47 is connected by a conductor 60 to the output line 2.

A novel feature of the present invention is providing contacts 61 and 62 to cooperate with the switch member 9 when in an open circuit position. The contact 61 is connected by a conductor 63 to the contact 8. The contact 62 is connected by a resistor 64 and conductor 65 to the negative output of the generator 1.

In operation, the potentiometer 57 is adjusted so that under normal load conditions, the voltage drop across the potentiometer 57 and resistor 54 are equal hence the flow of current in the coils 50 and 51 will be equal. Inasmuch as they are opposing, the effect of each on the armature 47 will be canceled permitting it to remain in a neutral position.

Upon the occurrence of a fault between the positive feeder and ground (or between the positive and negative feeders in an ungrounded system) the voltage drop across the resistor 54 and potentiometer 57 will be of unequal value due to the difference in current flowing in the output lines 2 and 3. This difference in voltage drop will cause one of the coils 50 or 51 of the relay 46 to exert a greater pull on the armature 47 thus moving it from the neutral position into operative relationship with one of the contacts depending upon the direction of unbalance.

Upon the armature 47 being actuated to engage either contact, the resistance 29 is short circuited. This increases the voltage applied to the coil 27 to a value above the predetermined minimum necessary to apply sufficient pull on the latch member 41 to overcome the bias of the spring 43 and actuate the member 41 to permit the spring 40 to actuate the switch members 9, 15 and 33 to open the generator field circuit and also deenergize the circuit for controlling the main line switch 38 thereby isolating the fault.

The switch member 9 upon actuation to the open circuit position coacts with the contacts 61 and 62 to connect the field winding 4 in opposition to the series winding 5. The voltage drop in the series winding 5 due to any short circuit current will be impressed on the field winding 4 in such a direction as to cause a reverse current to flow in field 4 which will in turn reduce the net M. M. F. producing flux across the air gap of the generator 1 and reduce or kill the short circuit current being put out by the generator. The resistor 64 limits the reverse current in the field 4 to a value which will not reverse the residual magnetism of the field circuit but will reduce the short circuit output to a point where it will fall off and will not build up again.

Referring now to Figure 2, wherein another embodiment of the invention is illustrated, there is provided a generator 75 having output lines 76 and 77, a field winding 78 and interpole and compensating winding 79. The winding 79 is connected in series with one output terminal of the generator 75 and the output line 76. A ground connection 80 connects the line 76 to ground. The field winding 78 is connected at one end to the line 76 by a conductor 81. The other end of the winding 78 is connected by a conductor 82, switch 83 and conductor 84 to one side of a carbon pile resistance element 85 of a regulator 86. The other end of the carbon pile element 85 is connected by conductor 87, switch 88 and conductor 89 to the output line 77.

The regulator 86 is shown diagrammatically as including an armature 90 pivoted at 91 and exerting a compressive force upon the carbon pile 85 under the tension of a spring 92. The spring 92 is arranged so as to balance the pull on the armature 90 by electromagnetic windings 93 and 94. One end of the winding 93 is connected by conductor 95 to ground. The other end of the winding 93 is connected by conductor 96, switch 97 and conductor 98 to the output line 77. A variable resistor 99 may be inserted in the conductor 96 to permit adjustment of the winding 93.

One end of the winding 94 is connected by conductor 100 to fixed contacts 101 of parallel relay 102. Movable contacts 103 of the relay 102 are connected by a conductor 104 to equalizer bus 105. The other end of the winding 94 is connected by conductor 106 to movable contact 107 of a resistor 108. One end of the resistor 108 is connected by a conductor 109 to ground. The other end of the resistor 108 is connected by a conductor 110 to the "D" terminal or negative brush of the generator 75.

The relay 102 has an electromagnetic winding 111 one end of which is connected by conductor 112, resistor 113, conductor 114, switch 115 and conductor 116 to ground. The other end of the winding 111 is connected by a conductor 117 to the conductor 96.

A switch arm 118 of pilot relay 119 is also connected to the conductor 117. The switch arm 118 in its normally open position cooperates with a contact 120 connected to conductor 112 and provides a shunt across the winding 111. The pilot relay 119 has an electromagnet winding 121, one end of which is connected to the conductor 117. The other end is connected by a resistor 122 to the conductor 114. Thus, the winding 121 is connected across the output of the generator 75 by conductors 98, switch 97, conductor 96, conductor 117, resistor 122, conductor 114, switch 115 and conductor 116. The switch member 118 when actuated to a closed position cooperates with contact 123 of the relay 119. The contact 123 is connected by a conductor 124 to one end of electromagnet winding 125 of a polarized differential voltage and reverse current relay 126. The contact 123 is also connected by a resistor 127 to the conductor 117.

The other end of the winding 125 is connected by conductor 128, switch member 129 and conductor 130 to the output line 77. The winding 125 actuates a switch member 131 in a direction dependent upon the direction of current flowing through the winding 125. One side of the switch member is connected by a conductor 132 to the conductor 87. When in a closed position, the switch member cooperates with a contact 133 which is connected by conductor 134, switch 135 and conductor 136 to one end of electromagnet winding 137 of contactor 138. The other end of the winding 137 is connected to grounded conductor 139. The relay 126 also has a reverse current winding 140, one end of which is connected by a conductor 141 to ground. The other end of the winding 140 is connected by a conductor 142 to the conductor 110.

Overvoltage and ground fault detecting panel 143 is comprised generally of a locating relay 144, an overvoltage relay 145 and a ground fault relay 146.

The locating relay 144 has an electromagnet winding 147 one end of which is connected by conductor 148 to the conductor 136. The other end of the winding 147 is connected by a conductor 149 to ground. Switch member 150 of the relay 144 is connected by a conductor 151 to the movable tap 107 of the resistor 106. When actuated to the closed position by energization of the winding 147, the switch member 150 cooperates with contact 152 connected by conductor 153 to one end of locating winding 154 of the overvoltage relay 145. The other end of the winding 154 is connected by conductor 155 to locating bus 156.

In addition to the locating winding 154, the overvoltage relay has a winding 157, one end of which is connected by conductor 158 to the conductor 149. The other end of the winding 157 is connected by a temperature compensating network 159 and conductor 160 to the conductor 87. The windings 154 and 157 coact to actuate switch members 161. The switch members 161 are connected by a conductor 162 to one side of a trip winding 163 on main circuit breaker 164. A resistor 165 may be inserted in the conductor 162. The other end of the winding 163 is connected by a conductor 166 to the conductor 87. The switch member 161 coacts when in the closed position with contacts 167. The contacts 167 are connected by a conductor 168 to the conductor 110.

The main circuit breaker 164 may be of the type described and claimed in U. S. Patent No. 2,560,628, issued July 17, 1951 to Robert L. Brown, and controls a switch member 169 in the output line 77, also switch members 83, 98, 97 and 129. In addition to the trip winding 163, the breaker 164 has a current winding 170 in series in the output line 77, a balancing winding 171 and a reset winding 172. The reset winding 172 has one end connected by conductor 173 and switch 174 to main bus 175. The other end of the winding 172 is connected to ground. In addition, the breaker 164 has a manual reset 176. One end of the balancing winding 171 is connected by a conductor 177 to the conductor 110. The other end of the winding 171 is connected by a conductor 178 to the grounded connection 149. A blocking rectifier 179 may be inserted in the conductor 178 to provide reverse current protection.

A novel feature of the invention resides in the means for protection against faults such as, for example, grounds. The ground fault relay 146 may be of a sensitive differential type and has a movable armature 180, contacts 181 and 182, and coils 183 and 184. The coil 183 is connected by conductors 185 and 186 across a resistance 187 located in the output line 77. The coil 184 is connected by conductors 188 and 189 across a resistance 190 located in the line 76. The contacts 181 and 182 are interconnected by conductor 191 and connected to the contacts 167 of the relay 145. The armature 180 is connected by a conductor 192 to one end of electromagnet winding 193. The other end of the winding 193 is connected by conductor 194 to the conductor 87.

The winding 193, when energized, actuates switch member 195 from a normally open position into cooperation with contact 196. The switch member 195 may be biased in the open position by a spring 197 or in any other conventional manner such as are well known in the art. The switch 195 is retained in the closed position by a latch member 198. It is understood, however, that other means may be used for retaining the switch member in the closed position.

The switch member 195 is connected by a conductor 199 to the conductor 82. The contact 196 is connected by conductor 200 to the conductor 110. A resistor 201 may be inserted in the conductor 200 to prevent a reversal of the polarity of the generator 75. The conductor 192 is connected by a conductor 202 to the conductor 162. A blocking rectifier 203 may be inserted in the conductor 202 to prevent energization of the winding 193 upon the over-voltage relay 145 only closing.

In operation, with the main breaker 164 and switches 115 and 135 in the closed position, the winding 121 is connected across the generator output and is so proportioned to overcome the bias of switch arm 118 to actuate it into contact with contact 123 upon the voltage of the generator rising to a predetermined value. Actuation of the switch arm 118 removes the short circuit from the winding 111 which actuates the switch members 103 to a closed position to connect the equalizer winding 94 to the system. The winding 94 affects the regulator 86 in a direction to raise the generator voltage slightly above the bus voltage. Upon the generator exceeding the bus voltage by a predetermined amount, the differential and reverse current relay 126 energizes the contactor coil 137 which actuates contactor 138 to connect the generator to the bus.

The current winding 140 of relay 126 is poled to normally hold the switch member in a closed position, however upon reverse current flowing in the generator, it actuates the member 131 to an open-circuit position thereby deenergizing the coil 137 to open the contactor 138.

Upon an overvoltage occurring, the overvoltage relay 145 energizes the trip coil 163 to open the breaker 164. The locator winding 154 coacts with the winding 157 to sense the overvoltage and also prevents the unaffected generators from being removed from the bus. The locating relay 144 connects the winding 154 in the system as the generator is connected to the bus. The blocking rectifier 203 prevents the winding 193 from being energized on an overvoltage.

Fault protection is obtained from the ground fault relay 146 operable upon an unbalance of current flowing from the generator. While shunts have been illustrated to detect the unbalance, it is understood that other methods may be used. Upon an unbalance occurring in either direction, the armature 180 is actuated into cooperation with one or the other of contacts 181 and 182. This completes a circuit through the rectifier 203 to energize the trip winding 163. The winding 193 is also energized to actuate the switch member 195 to a closed position to connect the positive field lead through a limiting resistor to the negative brush of the generator. Thus, the voltage drop in the series field due to the fault would be impressed on the shunt field in such a direction to cause a reverse current to flow therein and reduce the net M. M. F. producing flux across the air gap of the generator. The latch member 198 retains the switch member 195 is a closed position so that it will not open up upon the coil 193 being deenergized by the opening of the main breaker and associated switches.

Although only two embodiments of the invention have been illustrated and described, various changes in the form and relative arrangement of the parts may be made to suit requirements.

What is claimed is:

A protective system for a generator supplying a load bus through output conductors and having a main field winding and a series field winding, comprising a voltage regulator for controlling the excitation of the main field winding to maintain a predetermined output voltage, first switch means for connecting said generator to said load bus, first relay means for causing said first switch means to disconnect said generator from said load bus, second switch means for controlling the energization of said main field winding, second relay means for causing said second switch means to deenergize said main field winding, said second switch means being normally closed to complete the main field circuit, an overvoltage relay operable upon said generator voltage exceeding a predetermined maximum to energize said first relay means to cause said first switch means to open said connection between said generator and load bus, a fault relay operable in response to the occurrence of a fault in said generator or its output conductors to cause said first and second relay means to open said first and second switch means, and other circuit means to connect said main field winding in opposition to said series field winding, third switch means to control said other circuit means, means operably connecting said second relay means to said third switch means to render said other circuit means effective in response to the operation of said fault relay, blocking means between said overvoltage relay and said fault relay to prevent operation of said second relay means upon operation of said overvoltage relay.

References Cited in the file of this patent

UNITED STATES PATENTS

| Number | Name | Date |
| --- | --- | --- |
| 2,534,895 | Austin et al. | Dec. 19, 1950 |

FOREIGN PATENTS

| Number | Country | Date |
| --- | --- | --- |
| 129,068 | Great Britain | July 2, 1919 |
| 156,868 | Great Britain | Jan. 20, 1921 |